| United States Patent [19] | [11] Patent Number: 4,937,220 |
| Nickols, Jr. | [45] Date of Patent: Jun. 26, 1990 |

[54] METHOD TO RETARD CATALYST RECRYSTALLIZATION

[75] Inventor: Richard C. Nickols, Jr., East Hartford, Conn.

[73] Assignee: International Fuel Cells Corporation, South Windsor, Conn.

[21] Appl. No.: 230,385

[22] Filed: Aug. 8, 1988

[51] Int. Cl.$^5$ .................. B01J 23/64; B01J 23/42; H01M 4/88; H01M 4/86

[52] U.S. Cl. ..................... 502/185; 427/115; 429/40; 429/44; 502/101

[58] Field of Search .............. 502/185, 101; 427/115

[56] References Cited

U.S. PATENT DOCUMENTS

| 3,352,938 | 11/1967 | Plonsker et al. | 502/185 |
| 3,440,107 | 4/1969 | Barber | 136/120 |
| 3,470,019 | 9/1969 | Steele | 117/227 |
| 3,532,556 | 10/1970 | Steele | 136/120 |
| 3,857,737 | 12/1974 | Kemp et al. | 136/120 |
| 4,028,274 | 6/1977 | Kunz | 252/447 |
| 4,137,372 | 1/1979 | Jalan et al. | 429/44 |
| 4,137,373 | 1/1979 | Jalan et al. | 429/44 |
| 4,186,110 | 1/1980 | Jalan et al. | 252/447 |
| 4,202,934 | 5/1980 | Jalan | 502/185 |
| 4,316,944 | 2/1982 | Landsman et al. | 429/44 |
| 4,394,299 | 7/1983 | Puskas et al. | 502/185 |
| 4,430,391 | 2/1984 | Ovshinsky et al. | 429/40 |
| 4,447,506 | 5/1984 | Luczak et al. | 429/44 |
| 4,607,272 | 8/1986 | Osbourn | 357/30 |
| 4,716,087 | 12/1987 | Ito et al. | 502/331 |

FOREIGN PATENT DOCUMENTS 0106197  4/1984  European Pat. Off. ............ 502/185

*Primary Examiner*—Paul E. Konopka

[57] ABSTRACT

The rate of noble metal crystallite recrystallization on a carbon-supported noble metal catalyst is reduced by dispersing two or more different kinds of noble metal-containing crystallites onto the surface of the carbon support. The crystallites have either different unit cell configurations or different unit cell sizes. The reduced rate of noble metal crystallite recrystallization results, over a period of time, in higher crystallite surface area and therefore, better catalyst performance compared to conventional carbon-supported noble metal catalysts. Fuel cells which incorporate such improved catalysts as cathode catalysts are capable of operating at maximum power production for longer periods of time than fuel cells which use conventional catalysts as cathode catalysts.

7 Claims, No Drawings

METHOD TO RETARD CATALYST RECRYSTALLIZATION

DESCRIPTION

Technical Field

This invention relates generally to noble metal catalysts and more specifically to noble metal catalysts supported on carbon particles.

Background Art

A fuel cell is a device which converts chemical energy directly into electrical energy. A typical fuel cell comprises two electrodes, a cathode and an anode, and a matrix impregnated with an electrolyte. When supplied with a fuel, typically a hydrogen-rich gas, and an oxidant, typically air, the cell produces direct current electricity, water, and heat.

Noble metal catalysts are commonly used in both the cathode and anode of electrochemical fuel cells. The catalysts typically comprise platinum or platinum alloys in the form of small crystallites dispersed onto the surface of a carbon support. Among the platinum alloys in common use are $Pt_3Cr$ and PtV. Many other platinum alloys are suitable for use as fuel cell catalysts, including those described in commonly owned U.S. Pat. No. 4,186,110 to Jalen et al., U.S. Pat. No. 4,316,944 to Landsman et al., and U.S. Pat. No. 4,447,506 to Luczak et al. Besides differing in composition, platinum and platinum alloy crystallites may differ in unit cell configuration or unit cell size. For example, platinum crystallites have a face centered cubic unit cell configuration, while $Pt_3Cr$ crystallites have a simple cubic unit cell configuration. Platinum and PtV crystallites both have face centered cubic configurations but have different unit cell sizes. Platinum crystallites have a lattice parameter, the distance between atoms in the unit cell, of 3.920Å, while PtV crystallites have a lattice parameter of 3.875Å.

Fuel cell performance is directly related to the amount of catalyst surface area present on the fuel cell's electrodes. To achieve a high catalyst surface area at the lowest possible cost, small platinum or platinum alloy particles are dispersed on the surface of a carbon support material. The carbon support material is typically a graphitized carbon powder. The catalyst crystallites are deposited onto the carbon support by one of a number of well known means, such as those described in commonly owned U.S. Patent No. 4,316,944 to Landsman et al. and U.S. Pat. No. 3,857,737 to Kemp et al., and U.S. Pat. Nos. 3,532,556, 3,470,019 to Steele, and U.S. Pat. No. 3,440,107 to Barber. The carbon-supported catalyst is then incorporated into the fuel cell's cathode and anode.

Under normal fuel cell operating conditions, typically 150° C.-200° C. and 1 atm.- 8 atm., the small catalyst crystallites on the cathode tend to recrystallize into larger crystallites. Recrystallization is thought to result from a migration of the crystallites on the support surface and a subsequent recombination of adjacent crystallites into larger crystallites. The result is a loss in catalyst surface area and a commensurate decrease in fuel cell performance.

One method for retarding catalyst recrystallization is described in commonly owned U.S. Pat. No. 4,137,372 to Jalen et al. In that invention, porous carbon is deposited on and around the catalyst crystallites to minimize migration and therefore, recrystallization. Another method for minimizing catalyst recrystallization is described in commonly owned U.S. Pat. No. 4,028,274 to Kunz. In that invention, the carbon support material is pitted prior to the deposition of catalyst crystallites. The pits on the surface of the support material make it more difficult for crystallites to migrate to the vicinity of other crystallites and recombine with them.

Reducing catalyst crystallite recrystallization has the potential to significantly extend the useful life of fuel cell cathodes. Accordingly, there has been continuous development in this field of art of methods which inhibit recrystallization.

Disclosure of Invention

The present invention is directed toward solving the problem of catalyst crystallite recrystallization in fuel cell cathodes.

One aspect of the invention includes a catalyst comprising two or more kinds of noble metal-containing crystallites having different unit cell configurations dispersed onto the surface of a carbon support.

Another aspect of the invention includes a catalyst comprising two or more kinds of noble metal-containing crystallites having different unit cell sizes dispersed onto the surface of a carbon support.

Another aspect of the invention includes a fuel cell cathode containing one of the above recited catalysts.

Another aspect of the invention includes a fuel cell containing a cathode as recited above.

Another aspect of the invention includes a method for generating electricity from a fuel cell using a fuel cell as recited above.

The foregoing and other features and advantages of the present invention will become more apparent from the following description.

Best Mode for Carrying Out the Invention

Any combination of noble metal and noble metal alloy crystallites displaying suitable differences in either unit cell configuration or unit cell size may be used to practice this invention. The different crystallites should be dispersed in roughly equal weight proportions onto the surface of the carbon support in order to minimize the number of like crystallites in close proximity to each other, resulting in a lower probability of like crystallites recombining with each other (recrystallization).

A carbon-supported noble metal catalyst is either purchased from a vendor or prepared according to one of several known techniques. For example, a carbon-supported platinum catalyst may be prepared by dispersing carbon support particles in an aqueous solution of chloroplatinic acid, filtering the solution to remove the support particles, exposing the particles to formaldehyde, and then drying the particles. This method is described in the Background section of commonly owned U.S. Pat. No. 4,137,372 to Jalan et al., the disclosure of which is hereby incorporated by reference. Other methods of preparing a carbon-supported platinum catalyst include the methods disclosed in commonly owned U.S. Pat. No. 3,857,737 to Kemp et al. and U.S. Pat. Nos. 3,532,556, 3,470,019 to Steele, and U.S. Pat. No. 3,440,107 to Barber, the disclosures of which are hereby incorporated by reference.

Once the carbon-supported noble metal catalyst has been obtained, an alloying metal is dispersed onto the surface of the support to create a suitable noble metal alloy. Among the noble metal alloys known to have catalytic activity are $Pt_3Cr$, PtV, PtMn, PtMo, PtW, and many others. The most commonly used of these alloys are $Pt_3Cr$ and PtV.

The noble metal alloy crystallites are created according any one of several means, including the technique taught by commonly owned U.S. Pat. No. 4,316,944 to Landsman, et al., the disclosure of which is hereby incorporated by reference. According to that technique, a precursor catalyst, carbon particles onto which platinum crystallites have been deposited, can be dispersed in an aqueous solution of a metal-containing salt, filtered, and then heat treated. The noble metal alloy catalyst crystallite dispersed onto the carbon support should provide essentially the same fraction of the total active catalyst as will the other catalyst crystallites to be subsequently dispersed. For example, if two different catalyst crystallites are to be used, about half of the active catalyst by weight should be provided by the first catalyst crystallites.

Similarly, a second kind of noble metal crystallite is dispersed onto the surface of the carbon support. The second catalyst crystallites should have either a different unit cell configuration or unit cell size than the first catalyst crystallites. For example, if either $Pt_3Cr$ or PtV are chosen as the first catalyst, platinum could be chosen as the second catalyst.

Any suitable dispersion method, may be used to disperse the second catalyst crystallites onto the supports which already contain the first catalyst crystallites. For example, the catalyst containing noble metal alloy particles can be dispersed in an aqueous solution of chloroplatinic acid, filtered, exposed to formaldehyde, and dried. The second catalyst crystallites dispersed onto the carbon support should provide essentially the same fraction of the total active catalyst as will the other catalyst crystallites. For example, if two different catalyst crystallites are to be used, about half of the total active catalyst by weight should be provided by the second material chosen.

The number of different catalyst crystallites dispersed onto the surface of the carbon support need not be limited to two. Three or more different kinds of catalyst crystallites may be used as long as all of the crystallites have either different crystalline structures or lattice parameters. Ideally, each of the different crystallites should be dispersed onto the carbon support in roughly equal proportions to each of the other crystallites used. For example, in a catalyst containing two different kinds of crystallites, a proportion of 50 wt. %±10 wt. % of one kind of crystallite to the other kind of crystallite will provide the benefits claimed for this invention. In a catalyst containing three different kinds of crystallites a proportion of 33 wt. %±5 wt. % of one kind of crystallite to each of the other kinds of crystallites will provide the benefits claimed for this invention. Catalysts with greater deviations from these proportions should also display some of the benefits claimed for this invention. However, those skilled in the art will recognize that the magnitude of improved catalyst stability will fall off rapidly once the proportions of the different kinds of crystallites in the catalyst are no longer close to being equal.

EXAMPLE

A fuel cell catalyst comprising a total of 10% platinum by weight having two different kinds of platinum-containing crystallites was prepared in the following manner: 5 grams of a precursor catalyst purchased from DeGussa Corporation (Peterboro, NY) comprising 5 wt. % platinum-on-graphitized-carbon-black were dispersed in 75 ml of water followed by ultrasonic blending for 2 minutes. A solution of 0.17092 gram of chromic nitrate in 10 ml of water was then added to the solution. Following addition of the 10 ml of chromic nitrate solution, dilute hydrochloric acid was added to the solution until a pH of 5.5 was attained to cause the adsorption of the chromium species onto the supported catalyst. Stirring continued for 30 minutes. After filtering, the solids were dried at 90° C. and sieved through a 100 mesh screen. The sifted solids were then heat treated at 927° C. in flowing nitrogen for one hour, then at 593° C. for another hour to promote ordering of the platinum-chromium alloy. 3.6 grams of the resulting catalyst were dispersed in 210 ml of water followed by ultrasonic blending for 15 minutes. The solution was brought to 100° C. and 22 ml of a solution of chloroplatinic acid containing 0.18 gram of platinum were added. The solution was continuously stirred for one hour. 0.150 ml of formaldehyde and 20 ml of water were added to the solution to chemically reduce the deposited platinum to its metallic state. The solids were then dried at 90° C. and sieved through a 100 mesh screen. The solids were not heat treated again. The resulting catalyst comprised approximately 5 wt. % platinum in the form of $Pt_3Cr$ and approximately 5 wt. % platinum on a graphitized carbon support. Although a vendor supplied platinum-on-carbon-support catalyst was used as a precursor in this example, a laboratory prepared precursor would have been satisfactory.

To confirm the presence of two different kinds of platinum-containing crystallites on the surface of the catalyst, the catalyst was subjected to X-Ray diffraction analysis. This analysis showed that the catalyst was not homogeneous. Broad diffraction peaks implied that the catalyst was a mixture of alloyed and unalloyed material. Weak superlattice lines which indicated the presence of some $Pt_3Cr$ alloy were observed. The average lattice parameter was determined to be 3.898Å.

The surface area of the catalyst, which was determined by electrochemical methods, was found to be about 72 $m^2/g$. The performance of the catalyst was evaluated in a laboratory half-cell apparatus at 177° C. in 99% phosphoric acid. The oxygen activity at 0.9 V was 22 mA/mg Pt and the air voltage at 200 mA/$cm^2$ was 698 mV. This performance is essentially equal to unalloyed platinum.

To demonstrate the superiority of the catalyst which is the subject of this invention, a laboratory sintering test was run to compare the surface area stability of the new catalyst to a standard catalyst. The standard catalyst comprised an alloy of 50% platinum, 30% cobalt, and 20% chromium on a carbon support. The test was run for 168 hours at 232° C. and 0.75 V using 99% phosphoric acid as the electrolyte. The results are summarized in the table. The difference in surface area loss is considered to be significant by those skilled in the art.

TABLE

| Catalyst | Pre-test $m^2/g$ | Post-test $m^2/g$ | % Loss |
|---|---|---|---|
| New Catalyst $Pt_3Cr$ + Pt | 72 | 38 | 47 |
| Standard Catalyst $Pt_{50}Co_{30}Cr_{20}$ | 58 | 26 | 55 |

A catalyst which loses surface area at a lower rate than a conventional catalyst will, over a period of time, provide better catalyst performance than the conventional catalyst. In the context of a fuel cell, this improved catalyst performance may be manifested in several ways. For example, a fuel cell which uses a cathode containing a catalyst displaying the same improved stability as the new catalyst described above can be expected to operate at maximum power production for at least 10% longer than a fuel cell which uses a cathode containing a like amount of a conventional catalyst. Alternately, a fuel cell which uses a more stable cathode catalyst will require less catalyst to achieve the same level of performance as a fuel cell which uses a conventional cathode catalyst. Overall, incorporating a more stable catalyst into a fuel cell cathode results in a fuel cell which makes more effective use of the available catalyst than does a fuel cell which uses a conventional cathode catalyst.

Although this invention has been shown and described with respect to detailed embodiments thereof, it will be understood by those skilled in the art that various changes in form and detail thereof may be made without departing from the spirit and scope of the claimed invention.

I claim:

1. A catalyst particle having a high catalytic surface area, comprising:
   a carbon support; and
   a catalyst composition dispersed on the support in an amount effective to provide the high catalytic surface area, said catalyst composition comprising:
   platinum crystallites and platinum alloy crystallites in about equal amounts effective to retard recrystallization of the platinum crystallites and the platinum alloy crystallites and thereby provide improved stability to the catalytic surface area of the particle, said platinum alloy crystallites being selected from the group consisting of $Pt_3Cr$, PtV, PtMn, PtMo and PtW.

2. The particle of claim 1, wherein the platinum crystallites comprise between 40 wt. % and 60 wt. % of the catalyst composition.

3. The particle of claim 1, wherein the platinum alloy crystallites comprise between 40 wt. % and 60 wt. % of the catalyst composition.

4. The particle of claim 3, wherein the platinum crystallites comprise about 5 wt. % of the particle and the platinum alloy crystallites comprise between about 40% and about 60% of the catalyst composition.

5. The particles of claim 1, wherein the platinum alloy crystallites, comprise about 5 wt. % of the particle and the platinum crystallites comprise between about 40 wt. % and about 60 wt. % of the catalyst composition.

6. A catalyst particle having a high catalytic surface area, comprising:
   a carbon support; and
   a catalyst composition dispersed on the support in an amount effective to provide the high catalytic surface area, said catalyst composition comprising:
   from about 40 wt. % to about 60 wt. % platinum crystallites; and
   from about 40 wt. % to about 60 wt. % platinum alloy crystallites chosen from the group consisting of $Pt_3Cr$, PtV, PtMn, PtMo and PtW.

7. A catalyst composition comprising:
   a carbon support;
   about 5 wt. % platinum crystallites dispersed on the support; and
   about 5 wt. % $Pt_3Cr$ crystallites dispersed on the support.

* * * * *